United States Patent

Downs et al.

[11] Patent Number: 5,540,300
[45] Date of Patent: Jul. 30, 1996

[54] DRIVE AXLE ASSEMBLY WITH LUBRICANT COOLING SYSTEM

[75] Inventors: James P. Downs, Saginaw; Dale A. Frank, Fenton; Douglas B. Lutz, Shelby Township; Charles L. Rasmer, Bay City; Norman E. Schultz, Saginaw, all of Mich.

[73] Assignee: American Axle & Manufacturing Inc., Saginaw, Mich.

[21] Appl. No.: 370,203

[22] Filed: Jan. 9, 1995

[51] Int. Cl.[6] ........................................ F01M 9/06
[52] U.S. Cl. .................. 184/11.2; 184/6.12; 184/6.22; 184/11.1; 184/104.1; 74/606 A; 74/607; 475/160; 475/161
[58] Field of Search ............................ 64/6.12, 6.22, 64/11.1, 11.2, 13.1, 104.1; 74/606 A, 607; 475/160, 161, 230

[56] References Cited

U.S. PATENT DOCUMENTS

| | | |
|---|---|---|
| 1,247,276 | 11/1917 | Hurlburt . |
| 1,639,680 | 8/1927 | Acker . |
| 1,847,611 | 3/1932 | Hodgkinson . |
| 1,950,034 | 3/1934 | Mulford et al. . |
| 2,242,195 | 5/1941 | Teker et al. ........................ 184/11.1 |
| 2,696,074 | 12/1954 | Dolza . |
| 2,802,548 | 8/1957 | Mart et al. . |
| 2,908,351 | 10/1959 | Daley, Jr. . |
| 3,502,177 | 3/1970 | Christie . |
| 3,690,410 | 9/1972 | Sieghartner . |
| 3,736,812 | 6/1973 | Wellauer . |
| 3,874,183 | 4/1975 | Tabet . |
| 3,884,293 | 5/1975 | Pessolano et al. . |
| 4,114,477 | 9/1978 | Iverson . |
| 4,352,301 | 10/1982 | Fleury . |
| 4,393,922 | 7/1983 | Bahrle et al. . |
| 4,915,192 | 4/1990 | Hayashida et al. . |
| 5,316,106 | 5/1994 | Baedke et al. . |

FOREIGN PATENT DOCUMENTS 4023354  1/1992  Germany .

*Primary Examiner*—Edward K. Look
*Assistant Examiner*—Christopher Verdier
*Attorney, Agent, or Firm*—Reising, Ethington, Barnard & Perry

[57] ABSTRACT

A drive axle assembly has a gear housing, two axle tubes extending outwardly of the gear housing, a lubricant reservoir in the gear housing and a gear assembly rotatably mounted in the gear housing that has a rotatable member that is partially disposed in lubricant in the lubricant reservoir. The drive axle assembly also has a lubricant cooling system that includes a lubricant passage in fluid communication with the lubricant reservoir via an inlet that is juxtaposed the rotatable member so that the level of lubricant in the lubricant passage is raised when the rotatable member rotates. The lubricant passage has elevated outlets that deliver lubricant to lubricant ducts disposed in the respective axle tubes when the lubricant in the lubricant passage rises above a predetermined level. The lubricant flows away from the gear housing in the lubricant ducts and returns to the reservoir along the interior of the axle tubes which cools the lubricant as it returns to the reservoir.

19 Claims, 2 Drawing Sheets

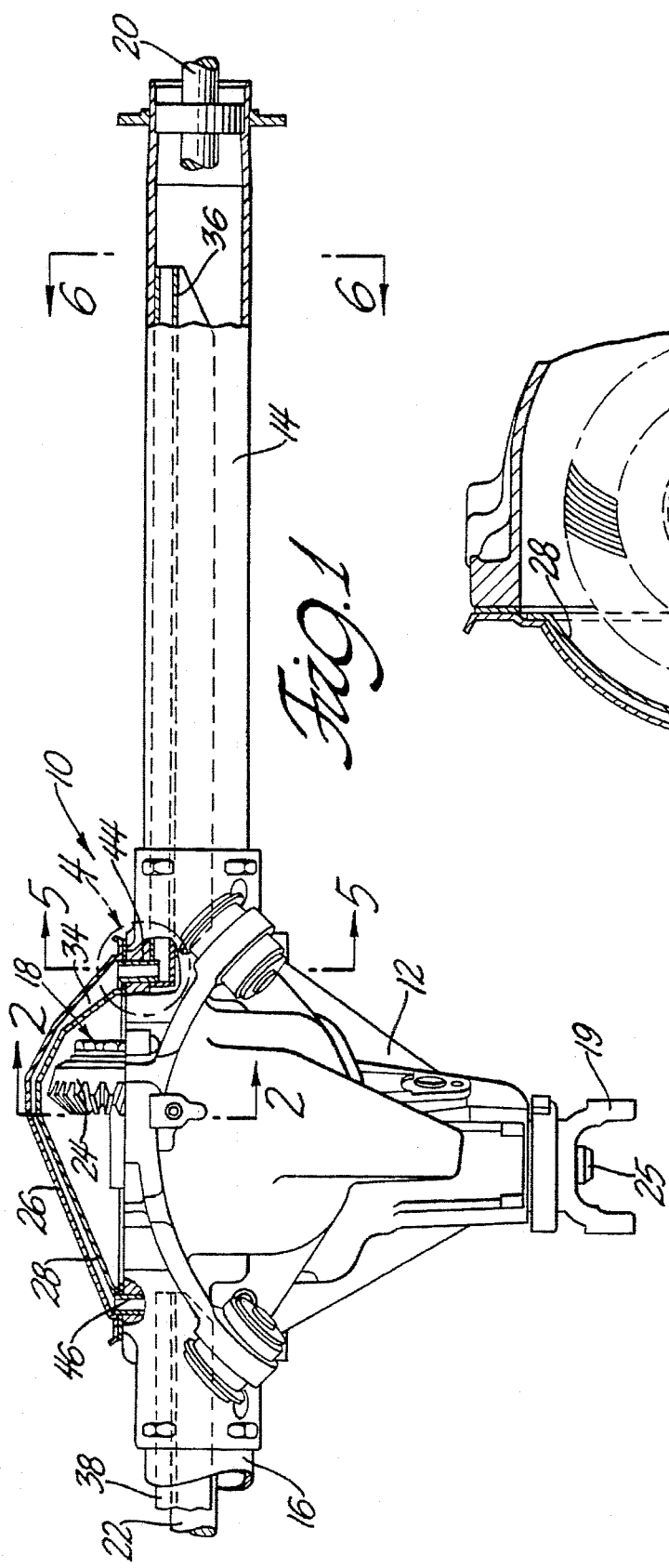

5,540,300

DRIVE AXLE ASSEMBLY WITH LUBRICANT COOLING SYSTEM

BACKGROUND OF THE INVENTION

This invention relates generally to drive axles and more particularly to drive axles that include a lubricant cooling system.

U.S. Pat. No. 1,247,276 granted to William B. Hurlburt Nov. 20, 1917 discloses a self oiling rear axle wherein a gear wheel throws oil from a sump up into a shell. The shell has a close fit with a worm wheel that drives the gear wheel. This worm wheel forces the oil into a duct that feeds the oil to inner and outer bearings through a network of interconnected ducts. The oil then returns to the sump. The patent does not discuss oil temperature nor mention oil cooling.

U.S. Pat. No. 1,950,034 granted to William A. Mulford et al Mar. 6, 1934 discloses a rear axle that has oil cooling provisions. This rear axle has a ring gear that carries scoops that dip into oil in the bottom of the housing and throw the oil up into the interior of a worm housing. The worm housing includes external fins for cooling the oil that is thrown into the worm housing. The worm gear then pumps the oil through oil passages to the worm bearings. The oil then circulates through the worm bearings and returns to the bottom of the housing.

U.S. Pat. No. 4,352,301 granted to Edward Fleury Oct. 5, 1982 discloses an axle assembly that also has an oil cooling system. This oil cooling system includes a small lubrication pump that picks up oil from a reservoir in a gear housing and pumps the oil through an external filter to cool and clean the oil. The filtered oil is returned by pipes that extend through the axle tubes. The returning oil flows outwardly along the axle tubes so that oil is sprayed onto the ends of the half shafts and delivered to the shaft end bearings via holes. The oil then returns to the axle tubes via reduction gear assemblies and drains back to the gear housing by gravity. The patent states that the oil is cooled due to the circulation through the external filter and also indicates that an external oil cooler may be added if the cooling provided by the external filter is insufficient.

German Patent Application DE 40 23 354 applied for by Mercedes-Benz Aktiengelesschaft and published Jan. 30, 1992 discloses a drive axle assembly that is equipped with an oil circulation system. In this system, a ring gear splashes oil from a reservoir up into an elevated internal chamber in the differential housing portion of an axle housing. The oil accumulates in the elevated chamber and then flows by gravity to axle bearings and hub gears at the outboard ends of the axle housing via internal conduits. The oil then flows back to the reservoir through the central passages of the axle housing that surround the axle shafts. The continuous exchange of oil reduces the operating temperature of the hub gears at the outboard ends of the axle housing.

None of the above patent documents disclose a drive axle assembly with a lubricant cooling system that is simple, efficient and economical.

SUMMARY OF THE INVENTION

The object of this invention is to provide a drive axle that has a lubricant cooling system that is simple, efficient and economical. This is achieved by using the rotation of the differential ring gear to circulate the lubricant along the axle tubes for cooling without any need for either a pump or an elevated accumulator chamber in the gear housing.

A feature of the invention is that the drive axle assembly includes a lubricant passage that is in constant fluid communication with an internal lubricant reservoir of the drive axle assembly so as to provide an effective and efficient means for a rotating ring gear to circulate lubricant along the axle tubes for cooling.

Another feature of the invention is that the drive axle assembly includes a lubricant passage that is in constant fluid communication with the reservoir of the drive axle and arranged so a rotating ring gear pressurizes lubricant in the lubricant passage for effective and efficient circulation of the lubricant along the axle tubes for cooling.

Still another feature of the invention is that the drive axle assembly includes a lubricant pressurization passage that is easily and conveniently formed by a cover insert that eliminates any need for significant modification to existing drive axle designs.

Still another feature of the invention is that the drive axle assembly includes a lubricant pressurization passage and a scoop type inlet for the lubricant pressurization passage that is provided by a cover insert that is easily manufactured and installed without any need for any substantial change to the cover or housing of existing drive axle designs.

Still another feature of the invention is that the drive axle assembly includes a lubricant pressurization passage that has an outlet in form of overflow tubes that are easily formed in a cover insert and easily connected to lubricant delivery ducts in the axle tubes for circulation of the lubricant along the axle tubes for cooling.

Still another feature of the invention is that the drive axle assembly includes a lubricant pressurization passage that allows overfill so as to accommodate a larger range of vehicle speeds.

Yet another feature of the invention is that the drive axle assembly includes internal lubricant delivery ducts that are easily fabricated and incorporated into the lubricant circulation system without any need for fluid connectors or connections that are difficult to install.

Still yet another feature of the invention is that the drive axle assembly includes internal lubricant delivery ducts that are easily installed and can easily be adjusted in length to achieve the desired degree of lubricant cooling.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a partially sectioned plan view of a drive axle assembly equipped with a lubricant cooling system in accordance with the invention;

FIG. 2 is a section taken substantially along the line 2—2 of FIG. 1 looking in the direction of the arrows;

FIG. 3 is a section taken substantially along the line 3—3 of FIG. 2 looking in the direction of the arrows;

DESCRIPTION OF THE INVENTION

Figure 4:
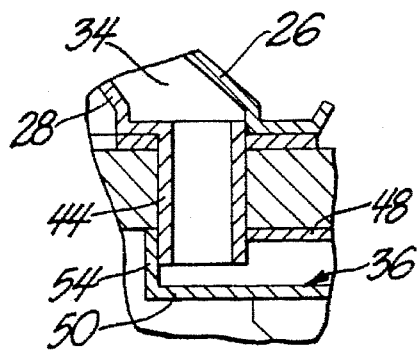
FIG. 4 an enlargement of a portion of FIG. 1.

Referring now to the drawing, a drive axle assembly 10 of the invention is shown as having a gear housing 12 and two axle tubes 14 and 16 extending outwardly from opposite sides of the gear housing.

A differential gear assembly 18 is rotatably mounted in the gear housing 12 and drivingly connected to an engine driven propeller shaft (not shown) by a yoke 19 for transferring power to a pair of vehicle wheels (not shown) via drive shafts 20 and 22 that extend through the respective axle tubes 14 and 16.

The differential gear assembly 18 is a conventional bevel gear differential of the type that is customarily used in automotive drive axles, particularly rear axles. A bevel gear differential operates in a well known manner so that its operation need not be described in detail for those skilled in the art to understand the invention.

The differential assembly 18 includes a ring gear 24 that is driven by a pinion gear (not shown) that is attached to the end of a stub shaft 25 that is connected to the propeller shaft (not shown) by yoke 19. When the drive axle assembly 10 is installed in a vehicle, the ring gear 24 rotates in one direction or the other whenever the vehicle is in motion.

The differential assembly 18 is installed in the gear housing 12 through a large rear opening that is conventionally closed by a stamped metal cover 26 after the differential assembly 18 is installed. The drive axle assembly 10 of the invention further includes an insert 28 that may be of stamped metal or molded plastic construction. The insert 28 provides an important feature of the invention as explained below.

When the cover 26 and the insert 28 are attached to the gear housing 12, a lubricant reservoir 30 is formed inside the gear housing 12. This reservoir is filled with lubricant 32 to a predetermined level so that the rotatable ring gear 24 forming part of the differential gear assembly 18 is partially disposed in lubricant 32 in the lubricant reservoir 30 and partially disposed above the lubricant 32 as best shown in FIG. 2.

As indicated above, the meshing gears of the differential gear assembly are constantly rotating when the vehicle is in motion, particularly, the ring gear 24 and the pinion gear (not shown) that drivingly engages the ring gear 24. This constant working of the meshing gears during vehicle operation, along with other internal frictions, produces heat that raises the temperature of the lubricant 32 in the lubricant reservoir 30. The drive axle assembly 10 of this invention includes a lubricant cooling system that reduces the operating temperature of the lubricant 32.

This lubricant cooling system comprises a lubricant passage 34 and two lubricant ducts 36 and 38 that extend from the gear housing 12 out into the respective axle tubes 14 and 16.

The lubricant passage 34 is formed by a space between the cover 26 and the insert 28 when they are attached to the gear housing 12. The passage 34 is in the nature of a standpipe in that the passage 34 is in constant fluid communication with the lubricant reservoir 30 via an inlet 40. The inlet 40 is formed in the bottom of the insert 28 so that the inlet 40 is exposed to lubricant 32 when the lubricant reservoir 30 is filled with lubricant at the predetermined level as shown in FIG. 2. Thus the passage 34 is also filled with lubricant at the predetermined level when the drive axle assembly 10 is idle.

The inlet 40 is disposed in alignment with the rotatable ring gear 24 so that the ring gear 24 pushes lubricant into the lubricant passage 34 as indicated by the arrows 41 when the ring gear 24 rotates in the clockwise direction as viewed in FIG. 2. This action of the ring gear 24 increases the pressure of the lubricant that is delivered to the lubricant passage 34 so that the lubricant in the lubricant passage 34 rises to a level that is higher than the level of lubricant in the lubricant reservoir 30 as indicated in FIG. 2. The amount of rise in the level of lubricant in the lubricant passage 34 is determined by the speed of the ring gear 24.

The inlet 40 is shaped from portions of the insert 28 to provide a scoop 42 that nests around a lower portion of the ring gear 24 as best shown in FIG. 3. This scoop 42 assists in directing lubricant into the inlet 40 and increases the efficiency of the rotating ring gear 24 in pressurizing and raising the level of lubricant in the passage 34.

The lubricant passage 34 has an elevated outlet disposed above the inlet 40 and above the predetermined level of lubricant 32 in the lubricant reservoir 30. This outlet delivers lubricant from the lubricant passage 34 to the lubricant ducts 36 and 38 when the lubricant in the lubricant passage 34 rises above a certain level.

Figure 5:
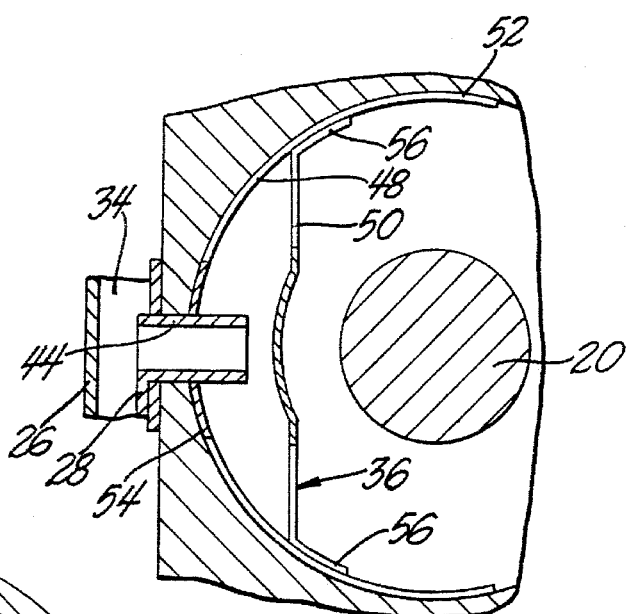
FIG. 5 is a section taken substantially along the line 5—5 of FIG. 1 looking in the direction of the arrows.

This outlet is in the form of two integrally formed tubes 44 and 46 at diametrically opposite portions of the insert 28 that are located at the horizontal center of the insert 28. The tubes 44 and 46 extend through bores in the gear housing 12 and into inlets formed by holes at the inboard ends of the respective lubricant ducts 36 and 38 as best shown in FIGS. 4 and 5.

Figure 6:
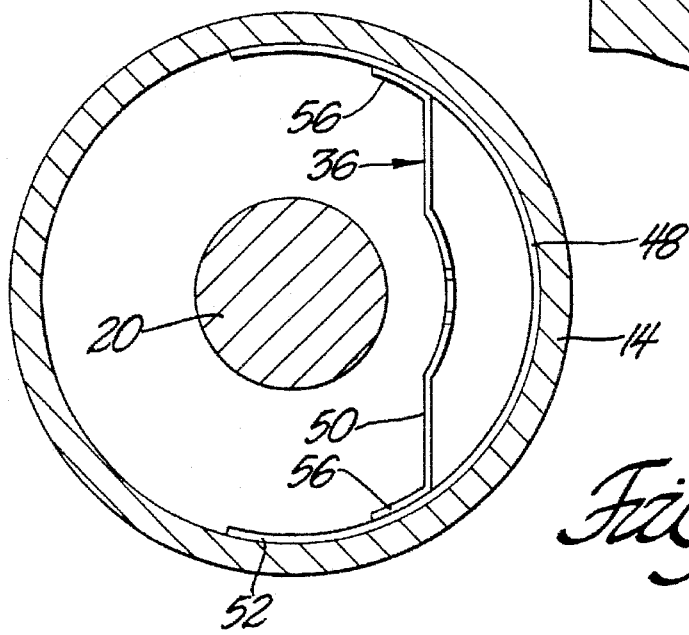
FIG. 6 is a section taken substantially along the line 6—6 of FIG. 1 looking in the direction of the arrows.
Figure 7:
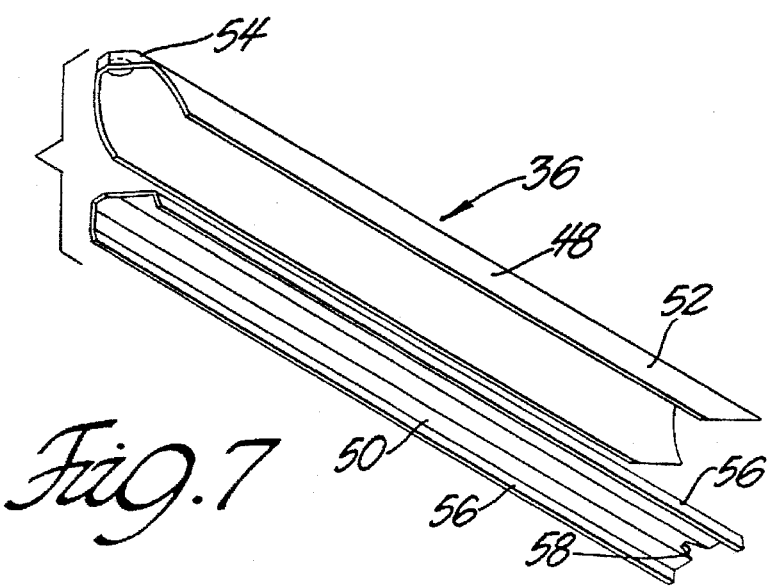
FIG. 7 is an exploded perspective view of a typical lubricant duct.

The lubricant delivered to the lubricant ducts 36 and 38 flows outwardly in the ducts to the remote or outboard ends of the lubricant ducts 36 and 38 which are open as best shown in FIG. 6.

Lubricant exiting ducts 36 and 38 then flows inwardly along the interior of the axle tubes 14 and 16 back to the lubricant reservoir 30 in the gear housing 12. This cools the lubricant considerably because the large area of the axle tubes 14 and 16 acts as a large heat sink that is kept at a relatively low temperature by ambient air flowing over the outer surfaces of the axle tubes 14 and 16 caused by the motion of the vehicle in which the drive axle assembly 10 is installed.

The lubricant flows from the axle tubes 14 and 16 back to the lubricant reservoir through slots 47 in the collar portions of the gear housing 12 that hold the inner ends of the axle tubes 14 and 16 as best shown in FIG. 2. The slots 47 are located approximately one inch below the centerline of the axle tubes 14 and 16. Slots 47 allow the returning lubricant to pass between the bearing shims and the gear housing 12.

The lubricant ducts 36 and 38 are identical. Each lubricant duct consists of two elongated parts 48 and 50 in the form of metal stampings or any such material that are tack welded or otherwise suitably secured together to provide a closed duct having an inlet at one end and an outlet at the other. The outer part 48 has an elongated part circular 52 section which is approximately 200 arcuate degrees and which matches the interior diameter of the axle tubes 14 and 16, preferably with a slight interference fit. The part circular shape of the outer part 48 radially locates the lubricant ducts 36 and 38 in their associated axle tubes 14 and 16 so that the lubricant ducts 36 and 38 are simply pushed into the axle tubes for assembly.

The inboard end 54 of the outer part 48 is flanged and trapezoidal in plan form and as indicated above, the inboard end of the outer part 48 has a hole to provide an inlet for the lubricant duct.

The inner part 50 is generally flat with curved elongated side flanges 56 that are fastened to the inner surface of the outer part 48 by any suitable means so as to form a relatively large duct that does not interfere with the axle shaft 20.

The outboard end of the inner part 50 has a notch 58 that is used to orient the lubricant ducts 36 and 38 in the axle tubes 16 and 18 so that the lubricant ducts are located at the back of the axle tubes 14 and 16 and so that the hole at their inboard end 54 aligns, with the bores in the gear housing 12 as shown in FIGS. 4 and 5. Thus the lubricant ducts 36 and 38 are located so that the front or coolest part of the axle tubes are retained for lubricant cooling. Moreover, the lubricant ducts 36 and 38 are automatically fluidly connected to the Lubricant passage 34 when the insert 28 is attached to the gear housing 12 so that the integrally formed tubes 44 pass through the bores and into the holes in the inboard ends 54 of the lubricant ducts 36 and 38.

As indicated earlier the outlet of the lubricant ducts are simply an open end of the ducts. Consequently the lubricant ducts can easily be made of any length to achieve a desired degree of cooling since the cooling depends in least in part on the length of the lubricant return path along the interior of the axle tubes 14 and 16.

In summary, the drive axle assembly 10 of this invention has a simple and efficient lubricant cooling system that is operated solely by the inherent rotation of the differential ring gear during vehicle movement. Moreover the lubricant cooling system can be incorporated in existing drive axle assemblies with little modification of existing parts and the addition of relatively inexpensive parts that are easily installed in the drive axle assembly. Of course scoops such as those illustrated in the Mulford patent and other enhancers can be used without departing from the scope of the invention.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A drive axle assembly having a gear housing and axle tubes extending outwardly of the gear housing, a lubricant reservoir in the gear housing, a rotatable member forming part of a gear assembly rotatably mounted in the gear housing, the rotatable member being partially disposed in a lubricant in the lubricant reservoir and partially disposed above the lubricant in the lubricant reservoir, and a lubricant cooling system, the lubricant cooling system comprising: a lubricant passage in fluid communication with the lubricant reservoir via an inlet that is exposed to lubricant in the lubricant reservoir, the inlet being disposed with respect to the rotatable member so that the lubricant passage is filled with a part of the lubricant to a level higher than the level of the lubricant remaining in the lubricant reservoir when the rotatable member rotates, the lubricant passage having an outlet disposed above the inlet for delivering the part of the lubricant from the lubricant passage when the part of the lubricant in the lubricant passage rises above a predetermined level, and lubricant ducts disposed in the respective axle tubes that have inlets in fluid communication with the outlet of the lubricant passage and outlets disposed outboard of the inlets that are in fluid communication with the axle tubes for returning the part of the lubricant from the lubricant ducts to the reservoir along the interior of the axle tubes.

2. The drive axle assembly as defined in claim 1 wherein the inlet of the lubricant passage is aligned with the rotatable member so that the part of the lubricant in the lubricant passage is pressurized when the rotatable member rotates.

3. The drive axle assembly as defined in claim 2 wherein the rotatable member is a ring gear and the inlet of the lubricant passage is formed as a scoop that is nested about a lower portion of the ring gear.

4. A drive axle assembly having a gear housing and axle tubes extending outwardly of the gear housing, a lubricant reservoir in the gear housing, a rotatable member forming part of a gear assembly rotatably mounted in the gear housing, the rotatable member being partially disposed in a lubricant in the lubricant reservoir and partially disposed above the lubricant in the lubricant reservoir, and a lubricant cooling system, the lubricant cooling system comprising:

a lubricant passage formed by a cover and an insert that are attached to the gear housing, the lubricant passage being in fluid communication with the lubricant reservoir via an inlet formed in the insert that is exposed to the lubricant in the lubricant reservoir, the inlet being disposed with respect to the rotatable member so that the lubricant passage is filled with a part of the lubricant to a level higher than the level of the lubricant remaining in the lubricant reservoir when the rotatable member rotates, the lubricant passage having outlets formed in the insert above the inlet for delivering the part of the lubricant from the lubricant passage when the part of the lubricant in the lubricant passage rises above a predetermined level, and lubricant ducts disposed in the respective axle tubes that have inlets in fluid communication with the outlets of the lubricant passage and outlets disposed outboard of the inlets that are in fluid communication with the axle tubes for returning the part of the lubricant from the lubricant ducts to the reservoir along the interior of the axle tubes.

5. The drive axle assembly as defined in claim 4 wherein the inlet of the insert includes a scoop that nests about a lower portion of the rotatable member.

6. The drive axle assembly as defined in claim 4 wherein the outlets formed in the insert are integral tubes and the inlets of the lubricant ducts are holes that receive the respective integral tubes when the insert is attached to the gear housing.

7. The drive axle assembly as defined in claim 4 wherein the insert is a metal stamping or a molded plastic part.

8. A drive axle assembly having a gear housing and axle tubes extending outwardly of the gear housing, a lubricant reservoir in the gear housing, a rotatable member forming part of a gear assembly rotatably mounted in the gear housing, the rotatable member being partially disposed in a lubricant in the lubricant reservoir and partially disposed above the lubricant in the lubricant reservoir, and a lubricant cooling system, the lubricant cooling system comprising:

a lubricant passage in fluid communication with the lubricant reservoir via an inlet that is exposed to the lubricant in the lubricant reservoir, the inlet being disposed with respect to the rotatable member so that the lubricant passage is filled with a part of the lubricant to a level higher than the level of lubricant in the lubricant reservoir when the rotatable member rotates, the lubricant passage having an outlet disposed above the inlet for delivering the part of the lubricant from the lubricant passage when the part of the lubricant in the lubricant passage rises above a predetermined level, and lubricant ducts disposed in the respective axle tubes that have inlets in fluid communication with the outlets of the lubricant passage and outlets disposed outboard of the inlets that are in fluid communication with the axle tubes for returning the part of the lubricant from the lubricant ducts to the reservoir along the interior of the axle tubes, the lubricant ducts being formed by inner and outer elongated parts that are secured together.

9. The axle assembly as defined in claim 8 wherein the outer parts have elongated particular portions that engage interior surfaces of the respective axle tubes to locate the lubricant ducts radially in the respective axle tubes.

10. The axle assembly as defined in claim 9 wherein the outer parts have holes at their inboard ends that provide the inlets for the lubricant ducts.

11. The axle assembly as defined in claim 9 wherein the inner parts have arcuate flanges for attaching the inner and the outer parts together.

12. The axle assembly as defined in claim 10 wherein the inner parts have a notch for orienting the ducts in the axle tubes.

13. The axle assembly as defined in claim 12 wherein the inner and the outer parts are metal stampings.

14. The drive axle assembly as defined in claim 1 wherein the lubricant passage comprises a cover that is attached to the gear housing.

15. The drive axle as defined in claim 14 wherein the lubricant passage further comprises an insert that is attached to the gear housing.

16. The drive axle assembly as defined in claim 14 wherein the gear housing has slots for returning the part of the lubricant from the axle tubes to the lubricant reservoir.

17. A drive axle assembly having a gear housing and axle tubes extending outwardly of the gear housing, a lubricant reservoir in the gear housing, a rotatable member forming part of a gear assembly rotatably mounted in the gear housing, the rotatable member being at least partially disposed in lubricant in the lubricant reservoir and a lubricant cooling system, the lubricant cooling system comprising:

a lubricant passage in fluid communication with the lubricant reservoir via an inlet that is exposed to lubricant in the lubricant reservoir, the inlet being disposed with respect to the rotatable member so that lubricant passage is filled with a part of the lubricant to a level higher than the level of lubricant remaining in the lubricant reservoir when the rotatable member rotates, and the lubricant passage having an outlet disposed above the inlet for delivering the part of the lubricant from the lubricant passage when the lubricant in the lubricant passage rises above a predetermined level.

18. The drive axle as defined in claim 17 wherein the gear housing has a slot for returning the part of the lubricant from the axle tubes to the lubricant reservoir.

19. The drive axle as defined in claim 18 wherein the drive axle assembly further includes lubricant ducts, disposed in the respective axle tubes that have inlets in communication with the outlet of the lubricant passage and outlets disposed outboard of the inlets that are in fluid communication with the axle tubes for delivering the part of the lubricant from the lubricant passage to the axle tubes.

* * * * *